United States Patent
Schleich et al.

(10) Patent No.: US 11,293,546 B1
(45) Date of Patent: Apr. 5, 2022

(54) CONTINUOUSLY VARIABLE TRANSMISSION TAP GEAR ENTRY RATIO SELECTION DURING TRANSIENT DRIVING CONDITIONS

(71) Applicant: GM Global Technology Operations LLC, Detroit, MI (US)

(72) Inventors: Zachary T. Schleich, Wixom, MI (US); Xuefeng T. Tao, Northville, MI (US); Nick Loedeman, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/085,156

(22) Filed: Oct. 30, 2020

(51) Int. Cl.
| | | |
|---|---|---|
| *B60W 50/06* | (2006.01) | |
| *F16H 61/662* | (2006.01) | |
| *B60W 10/06* | (2006.01) | |
| *B60W 10/101* | (2012.01) | |
| *B60K 17/16* | (2006.01) | |
| *B60W 30/19* | (2012.01) | |
| *B60K 17/06* | (2006.01) | |
| *B60K 17/02* | (2006.01) | |
| *B60K 23/00* | (2006.01) | |
| *F16H 61/66* | (2006.01) | |

(52) U.S. Cl.
CPC .......... *F16H 61/662* (2013.01); *B60K 17/02* (2013.01); *B60K 17/06* (2013.01); *B60K 17/16* (2013.01); *B60K 23/00* (2013.01); *B60W 10/06* (2013.01); *B60W 10/101* (2013.01); *B60W 30/19* (2013.01); *B60W 50/06* (2013.01); *F16H 2061/6604* (2013.01); *F16H 2061/66213* (2013.01)

(58) Field of Classification Search
CPC .......... F16H 61/662; F16H 2061/6604; F16H 2061/66213; B60K 17/02; B60K 23/00; B60K 17/06; B60K 17/16; B60W 10/101; B60W 10/06; B60W 50/06; B60W 30/19
See application file for complete search history.

(56) References Cited

U.S. PATENT DOCUMENTS 10,024,427 B1 * 7/2018 Gessner ................ F16H 61/662
2018/0320768 A1 * 11/2018 Duan ...................... F16H 37/06

FOREIGN PATENT DOCUMENTS

DE 102014225441 A1 * 6/2015 ............ B60W 10/08
JP 5326451 B2 * 10/2013

* cited by examiner

Primary Examiner — Justin Holmes
(74) Attorney, Agent, or Firm — Vivacqua Crane PLLC

(57) ABSTRACT

A system of selecting a transmission manual mode entry gear during transient driving conditions of an automobile vehicle includes a transmission in an automobile vehicle. An engine is connected to the transmission. A torque converter is connected to the transmission, and a differential provides drive output. A controller is in communication with the engine and the transmission. A shift device is in communication with the controller allowing manual selection by an operator of the automobile vehicle between a Park, a Reverse, a Neutral, a Drive and a Low or Manual (PRNDL) operating modes. A predicted gear is frozen close to a real gear at a time of entrance into the Manual mode.

18 Claims, 4 Drawing Sheets

CONTINUOUSLY VARIABLE TRANSMISSION TAP GEAR ENTRY RATIO SELECTION DURING TRANSIENT DRIVING CONDITIONS

INTRODUCTION

The present disclosure relates to automobile vehicle transmissions and operator manual mode selection during vehicle operation.

Automobile vehicles having a continuously variable transmission (CVT) commonly allow an operator to change from an automatic shift mode to a manual gear of operation by selecting a manual shift (M) option of a transmission shifter. Common manual shift operation of CVT transmissions is also known as a tap-up-tap-down (TUTD) mode operation and includes an initialization algorithm that freezes the variator ratio to a desired variator ratio which is determined by a steady-state driving ratio map. The operator commonly anticipates the transmission variator ratio to freeze at the operator desired variator ratio. It has been found that when the algorithm freezes to the desired variator ratio using data from a steady-state driving ratio map excessive transmission shifting after entry into the TUTD mode during accelerator pedal application or lift out may occur.

Thus, while current continuously variable transmission control systems achieve their intended purpose, there is a need for a new and improved system and method for selecting a transmission manual mode entry gear during transient driving conditions of an automobile vehicle.

SUMMARY

According to several aspects, a system of selecting a transmission manual mode entry gear during transient driving conditions of an automobile vehicle includes a transmission in an automobile vehicle. An engine is connected to the transmission. A torque converter is connected to the transmission, and a differential provides drive output. A controller is in communication with the engine and the transmission. A shift device is in communication with the controller allowing manual selection by an operator of the automobile vehicle between a Park, a Reverse, a Neutral, a Drive and a Low or Manual (PRNDL) operating modes. Upon entrance into the Manual mode a predicted gear is frozen close to a real gear at a time of entrance into the Manual mode.

In another aspect of the present disclosure, the transmission defines a continuously variable transmission (CVT) having a first pulley connected to the input shaft and a second pulley rotatably driven by a belt displaceably connected to the first pulley and the second pulley.

In another aspect of the present disclosure, a range of pulley ratios is split into multiple bins independently defining successive segments of an overall range of ratios of the CVT.

In another aspect of the present disclosure, a bin center is identified for individual ones of the multiple bins.

In another aspect of the present disclosure, the predicted gear defines a predicted ratio and the real gear defines a real ratio of the CVT. The predicted ratio is frozen at one of the bin centers close to the real ratio at the time of entrance into the Manual mode defined as the one of the bin centers being approximately one bin to two bins removed from the real ratio at the time of entrance into the Manual mode.

In another aspect of the present disclosure, an offset is added to the CVT real ratio at the time of entrance into the Manual mode.

In another aspect of the present disclosure, the offset is based on a rate of change of the real ratio and is retrieved from a memory in a calibratable lookup table.

In another aspect of the present disclosure, the transmission defines a planetary gear transmission having a sun gear, a ring gear and a carrier assembly.

In another aspect of the present disclosure, a clutch and a brake are provided which when selectively actuated provide for one of the Park mode, the Reverse mode, the Neutral mode, the Drive mode and the Manual mode, with the clutch driving the differential.

In another aspect of the present disclosure, the predicted gear is frozen at a time of entrance into the Manual mode; and an offset is added to the real gear, the offset based on a rate of change of the real gear and is retrieved from a memory in a calibratable lookup table.

According to several aspects, a method of selecting a continuously variable transmission manual mode entry ratio during transient driving conditions of an automobile vehicle comprises: providing a continuously variable transmission (CVT) in an automobile vehicle connected to an engine; controlling the engine and the CVT using a controller; positioning a shift device in communication with the controller allowing selection by an operator of the automobile vehicle between a Park mode, a Reverse mode, a Neutral mode, a Drive mode and Manual mode; splitting a range of ratios of the CVT into multiple bins independently defining successive segments of the range of ratios; and freezing a predicted ratio of the CVT at a time of entrance into the Manual mode at a center of one of the multiple bins close to a CVT real ratio.

In another aspect of the present disclosure, the method further includes adding an offset to the CVT real ratio at the time of entrance into the Manual mode.

In another aspect of the present disclosure, the method further includes calculating the offset using a rate of change of the CVT real ratio.

In another aspect of the present disclosure, the method further includes retrieving the offset from a memory in a calibratable lookup table.

In another aspect of the present disclosure, the method further includes the center of one of the multiple bins close to the CVT real ratio defining the bin center approximately one bin to two bins removed from the CVT real ratio at the time of entrance into the Manual mode.

In another aspect of the present disclosure, the method further includes connecting a first pulley to an input shaft and rotatably driving a second pulley by a belt displaceably connected to the first pulley and the second pulley.

In another aspect of the present disclosure, the method further includes connecting a torque converter to the CVT and providing a differential for a drive output for the automobile vehicle.

According to several aspects, a method of selecting a transmission manual mode entry gear during transient driving conditions of an automobile vehicle, comprises: shifting a PRNDL shift device to a Manual mode to shift a continuously variable transmission (CVT) to a manual mode; applying an offset to a real ratio of the CVT; rounding the real ratio to a closest bin ratio center in a direction of the shift to improve shift consistency; and determining if a calculated entry ratio will cause a shift past a requested or desired ratio.

In another aspect of the present disclosure, the method further includes retrieving the offset from a lookup table saved in a memory; and basing the offset on a rate of real ratio change.

In another aspect of the present disclosure, the method further includes entering the manual mode at the calculated entry ratio if the calculated entry ratio will not cause a shift past the desired ratio; and entering the manual mode at the desired ratio if the calculated entry ratio will cause a shift past the desired ratio.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
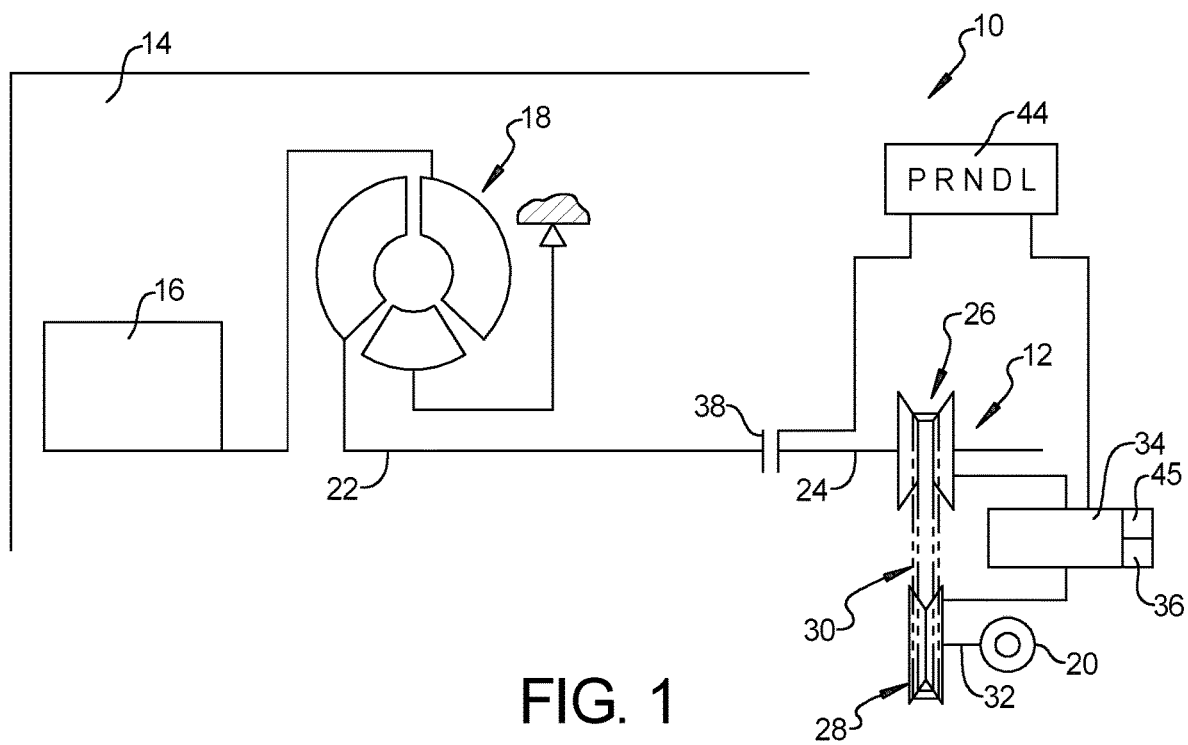
FIG. 1 is a diagram of a system and method of selecting a transmission manual mode entry gear during transient driving conditions of a continuously variable transmission according to an exemplary aspect.

Referring to FIG. 1, a system and method of selecting a transmission manual mode entry gear during transient driving conditions 10 according to several aspects is directed to a powertrain having a continuously variable transmission (CVT) 12 in an automobile vehicle 14. It is noted and described in further detail below that the system and method of selecting a transmission manual mode entry gear during transient driving conditions 10 may also be applied to other transmission designs such as a multiple speed planetary gear transmission.

In addition to the CVT 12 the powertrain includes an engine 16, a torque converter 18, and a differential 20. The torque converter 18 includes an impeller (I) driven by the engine 16, a turbine (T) adapted to deliver power through an input shaft 22 and a stator (S) which provides the torque multiplication of the torque converter 18 in a well-known manner. The input shaft 22 is drivingly connected with an input drive member 24 which is connected to an input sheave or first pulley 26 of the CVT 12.

The CVT 12 also has an output sheave or second pulley 28 which is interconnected with the first pulley 26 by a belt or chain 30. The chain 30 may be constructed in a well-known manner of a plurality of steel blocks held together by multiple steel bands. The belt 30 is maintained in tension between the first pulley 26 and the second pulley 28, such that a friction drive is obtained in a well-known manner between the first pulley 26 and the second pulley 28. The first pulley 26 and the second pulley 28 individually have one movable side sheave and one fixed side sheave such that the operating diameter of the belt 30 can be adjusted between the first pulley 26 and the second pulley 28, thereby changing a ratio between the input drive member 24 and an output shaft 32 which is connected with the differential 20 providing a drive output for the automobile vehicle 14.

Referring to FIG. 2 and again to FIG. 1, a diameter of the first pulley 26 and the second pulley 28 is controlled in a well-known manner by a controller 34 which may include an electronic processor or a digital computer and a memory 36 in combination with a hydraulic control system in a hydraulic pump (not shown). These systems are well known, such that a more complete description is not believed necessary for those skilled in the art to understand the operation of the CVT 12.

The terms controller, control module, module, control, control unit, processor and similar terms used herein refer to any one or multiple combinations of application specific integrated circuit(s) (ASICs), electronic circuit(s), central processing unit(s), e.g., microprocessor(s) and associated non-transitory memory components in the form of memory and storage devices including but not limited to read only, programmable read only, random access, hard drive, and the like. A non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Individual controllers execute control routine(s) providing desired functions, including monitoring inputs from sensing devices and other networked controllers and executing control and diagnostic instructions to control operation of one or more actuators. Routines may be executed at regular intervals, for example in increments of predetermined microseconds during ongoing operation.

Alternatively, routines may be executed in response to occurrence of one or more triggering events. Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via conductive medium, electromagnetic signals exchanged via air, optical signals exchanged via optical waveguides, and the like. Data signals may include signals representing inputs from sensors, signals representing actuator commands, and communication signals between controllers.

When the CVT 12 is placed in Drive through the engagement of a clutch 38, the input or first pulley 26 is adjusted by the controller 34 such that a minimum forward radius 40 may be attained. As is a general rule in controlling CVTs, the output or second pulley 28 is controlled in response to the movement of the input or first pulley 26. The input or first pulley 26 is therefore pressurized sufficiently to cause the first pulley 26 and the second pulley 28 to obtain their desired diameters and a tension on the belt 30 as well as the pressure applied to the first pulley 26 will permit the second pulley 28 to be adjusted and thereby provide the proper operating diameter. With the minimum forward radius 40 set in the first pulley 26, an overall ratio is established for the CVT 12. When the CVT 12 is placed in overdrive through the engagement of the clutch 38, the input or first pulley 26 is adjusted by the controller 34 such that a maximum forward radius 42 is attained.

With continuing reference to FIG. 1 the CVT 12 in communication with the controller 34 may be operated by selections made using a shift device 44 which allows manual selection by an operator of the automobile vehicle 14 between a Park, a Reverse, a Neutral, a Drive and a Low or Manual (PRNDL) operating modes. The shift commands are communicated through the controller 34 and control operation of the CVT 12 including a ratio defined by a position of the belt 30 on the first pulley 26 and the second pulley 28 displaced by change of a hydraulic system pressure. Operation in Drive mode provides a substantially infinite selection of ratio values within a predetermined hardware limited range as the drive belt 30 shifts to different positions on the first pulley 26 and the second pulley 28. Specific gear shift points are therefore not provided or felt by the operator in Drive mode. Vehicle speed is controlled as commonly known using pedal positions of a throttle pedal and a brake pedal (not shown).

CVT 12 pulley ratios may be defined as follows. A real ratio is defined as an actual CVT ratio being produced by pulley positions at a current time. A requested or desired ratio is defined as an instantaneous driver requested ratio based on a pedal position and a vehicle speed, which may be altered based on multiple elements including a selected drive mode such as a sport mode, aggressive driving at high accelerator pedals, during rapid pedal movements, during transmission protective modes including high transmission temperature operation, during uphill or downhill operation, operator PRNDL selection such as Manual, and the like. A commanded ratio is defined as a ratio calculated to be a safe operating condition and a transmission hardware capable condition based on a difference between the real ratio and the desired ratio, where system pressure is being controlled to change pulley positions in a ramping change toward the desired ratio.

Predetermined shift maps saved in a memory are normally used to achieve ratio changes. An optimal shift map or optimal shift ratio selection is based on vehicle speed, pedal inputs and other factors. Known CVT optimal shift maps are developed or optimized based on steady-state driving conditions, with conditions reflecting slow or steady pedal changes. A shift map ratio based on steady state driving may not match an intended driving state desired by the vehicle operator or obtained during a transient state of operation when the operator selects the tap-up-tap-down (TUTD) or Manual mode. A new method for selecting a ratio for manual mode upon entry during transient driving operation is desired for improving entry time, safety, and hardware durability. Transient driving operation is defined herein as operation when the desired ratio does not equal the real ratio and the commanded ratio is actively pursuing a desired ratio request.

To improve an accuracy and speed of shifts during transient driving operation for the CVT 12 during Manual mode operation the system and method of selecting a transmission manual mode entry gear during transient driving conditions 10 provides a range of pulley or variator ratios split into multiple "bins" independently defining successive segments of an overall range of ratios or gears of the CVT 12. For example, a quantity of six, seven, eight or more bins may be pre-assigned to the overall range of ratios, individually defining successive ratio ranges of the CVT 12. The successive bins may also equate to individual gears such as a first gear, a second gear, a third gear and the like.

According to several aspects, selection of Manual mode, also known as Tap-Up-Tap-Down (TUTD) mode may be made by the operator during a period of rapid pedal motion changes, for example to slow the automobile vehicle 14 during downhill driving or to accelerate the automobile vehicle 14 during uphill driving or a passing operation when additional control of a vehicle speed, an acceleration rate or a deceleration rate is desired by the operator. During entrance into TUTD or Manual mode the CVT 12 is therefore initially assumed not to be at an operator requested or desired ratio, as the real ratio at the time of entrance may be multiple ratio bins away from the desired ratio bin based on pedal position. According to the present disclosure, to provide a consistent entrance into TUTD or Manual mode, when the operator selects Manual mode a predicted real ratio is determined based on a predicted value of the real ratio in the near future such as by use of a Kalman filter, or by offsetting the real ratio as a function of a real ratio rate of change at the time of entrance into Manual mode. Determining the predicted real ratio in this way allows the transmission to obtain the frozen initial TUTD entry ratio faster and in a more consistent way while being less pronounced to the operator by also mitigating against the real ratio overshooting the frozen entry ratio.

For example, if Manual mode is entered when the CVT 12 is presently operating in a real ratio defining a second bin ratio which may also be defined as a second gear, and the operator changes a pedal position indicating a desire to change to a seventh bin ratio which may be defined as a seventh gear, a shift change to the seventh bin ratio may take 5 to 7 seconds. The ratio changes or gear shifts from the second bin to the seventh bin using steady state conditions as known may result in poor performance in achieving the overall shift. According to the present disclosure as noted above to provide a consistent entrance into TUTD or Manual mode, when the operator selects Manual mode a predicted real ratio is determined based on a predicted value of the real ratio in the near future such as by use of a Kalman filter, or by offsetting the real ratio as a function of a real ratio rate of change at the time of entrance into Manual mode. According to several aspects, the predicted real ratio may be selected at a bin center proximate or "close to" the real ratio at the time of entrance into Manual mode. A predicted real ratio "close to" the initial bin or gear real ratio may be approximately one to two bins away from the real ratio bin. For example, when the real ratio is the second bin ratio the bin "close to" the real ratio bin may be the third bin ratio or the fourth bin ratio. Predicting the real ratio at the time of entrance into the Manual mode permits achieving faster and smaller shifts, thereby providing a shift time less than 5 to 7 seconds, with the smaller shifts being less pronounced to the operator. The ultimate shift to the seventh bin, if desired by the operator, may then be achieved by manual operation taken by the operator such as via a button or a paddle shifter.

With continuing reference to FIG. 1 according to several aspects selecting the ratio to freeze a TUTD or Manual entry ratio to is based on the CVT real ratio adjusted by addition of a predetermined offset 45 in lieu of using a desired pulley or variator ratio based on steady state driving conditions as is known. The CVT real ratio defines the ratio the CVT 12 is actually operating at a time when entering Manual mode. The offset 45 is added to the CVT real ratio to prevent overshoot. The offset 45 is retrieved from the memory 36 in a calibratable lookup table and is based on a rate of change of the real ratio.

It is noted the real ratio may be rounded to a nearest bin gear center in a shift direction in order to improve the consistency of the first shift performed after entry into TUTD mode. If a calculated entry ratio would cause the pulleys to shift past the desired ratio, the desired ratio is used as the entry ratio.

Figure 2:
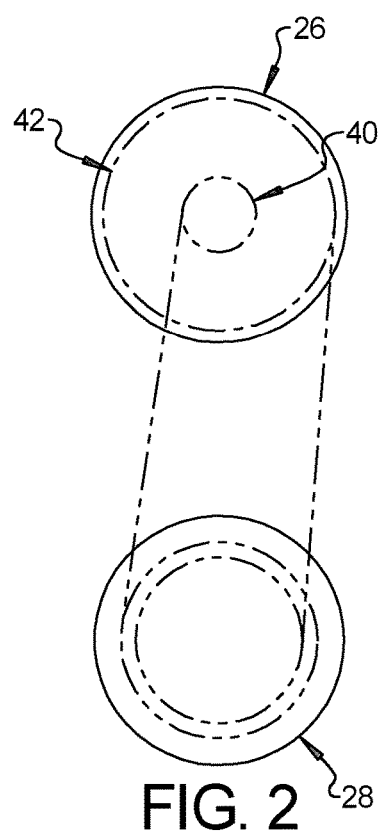
FIG. 2 is an end elevational view of a pulley and chain assembly of the system of FIG. 1.

Referring to FIG. 3 and again to FIGS. 1 and 2, a graph 46 presents multiple operational values including a vehicle speed 48 over time and an engine speed 50 over time and provides a comparison of entrance into the TUTD mode using the known desired ratio method against the system and method of the present disclosure. An accelerator pedal change 52 is made for which a TUTD entry ratio 54 would historically be made using a desired ratio 56. Using the system and method of selecting a transmission manual mode entry gear during transient driving conditions 10 according to the present disclosure a real ratio 58 is applied in lieu of the desired ratio 56 to determine a TUTD entry ratio 60. The TUTD entry ratio reduces shift time into the TUTD mode by approximately 2.0 to 2.5 seconds for the example shown.

Figure 3:
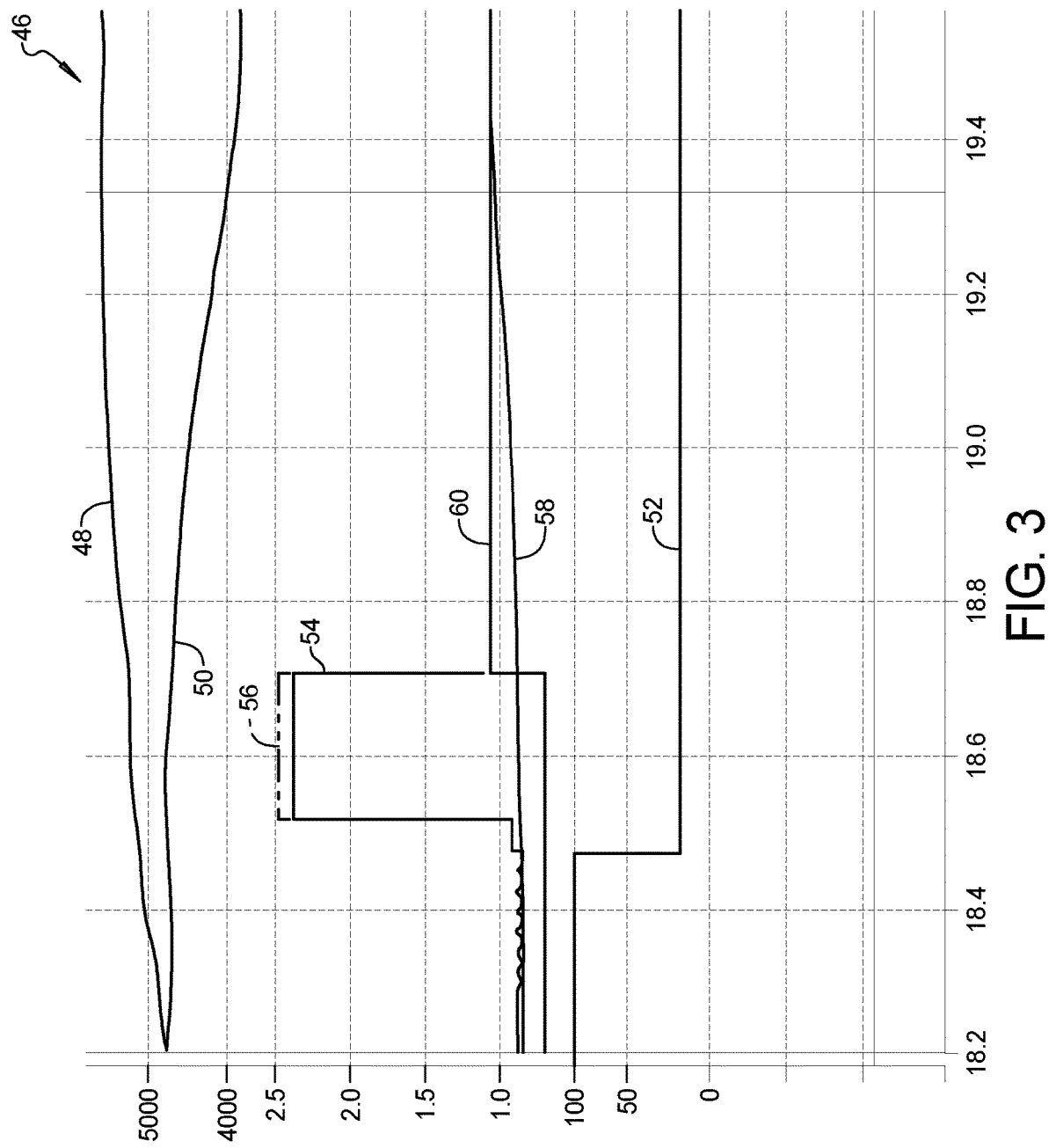
FIG. 3 is a graph of engine and transmission performance using the system and method of FIG. 1.
Figure 4:
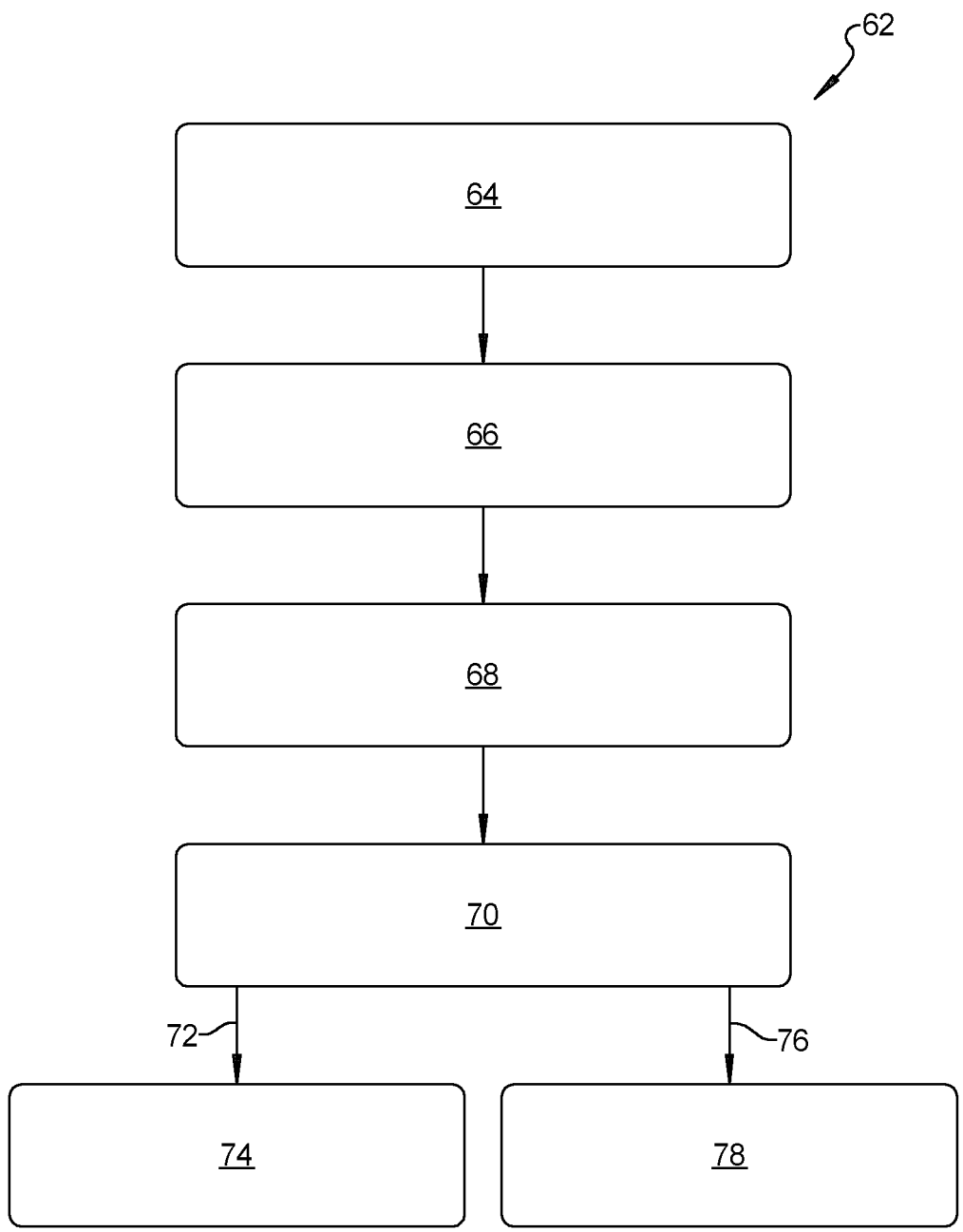
FIG. 4 is a flow diagram depicting steps for performing the method of FIG. 1.

Referring to FIG. 4 and again to FIGS. 1 through 3, an algorithm performing method steps 62 of the present disclosure is turned on via calibration, and the automobile vehicle 14 has a TUTD mode. To actuate the present system, in a shift step 64 the operator first shifts the PRNDL shift device 44 to the L or Manual position. In an application step 66, when the operator selects Manual mode a predicted real ratio is determined based on a predicted value of the real ratio in the near future such as by use of a Kalman filter, or by application of an offset 45 applied to the real ratio as a function of a real ratio rate of change at the time of entrance into Manual mode. The offset 45 is calibratable and is applied to the real ratio to prevent ratio overshoot. The offset 45 is retrieved from a lookup table saved in the memory 36 and is based on a rate of ratio change. In a rounding step 68, the predicted real ratio is rounded to a closest bin gear center in a direction of the shift to improve shift consistency. In a determination step 70, a determination is made if the calculated TUTD entry ratio will cause a shift past the desired ratio.

If a response to the determination step 70 is a NO signal 72, in a base entry step 74 the TUTD mode is entered at the calculated TUTD entry ratio. If a response to the determination step 70 is a YES signal 76, in an alternate entry step 78 the TUTD mode is entered at a desired ratio.

The predicted real ratio at entry is rounded to the nearest bin gear center to improve consistency of the first shift made in TUTD mode. The desired ratio is chosen as the entry ratio when TUTD mode is entered during steady state conditions. The target ratio is selected upon entry to TUTD mode by using the current real ratio and its rate of change in lieu of the desired ratio.

Figure 5:
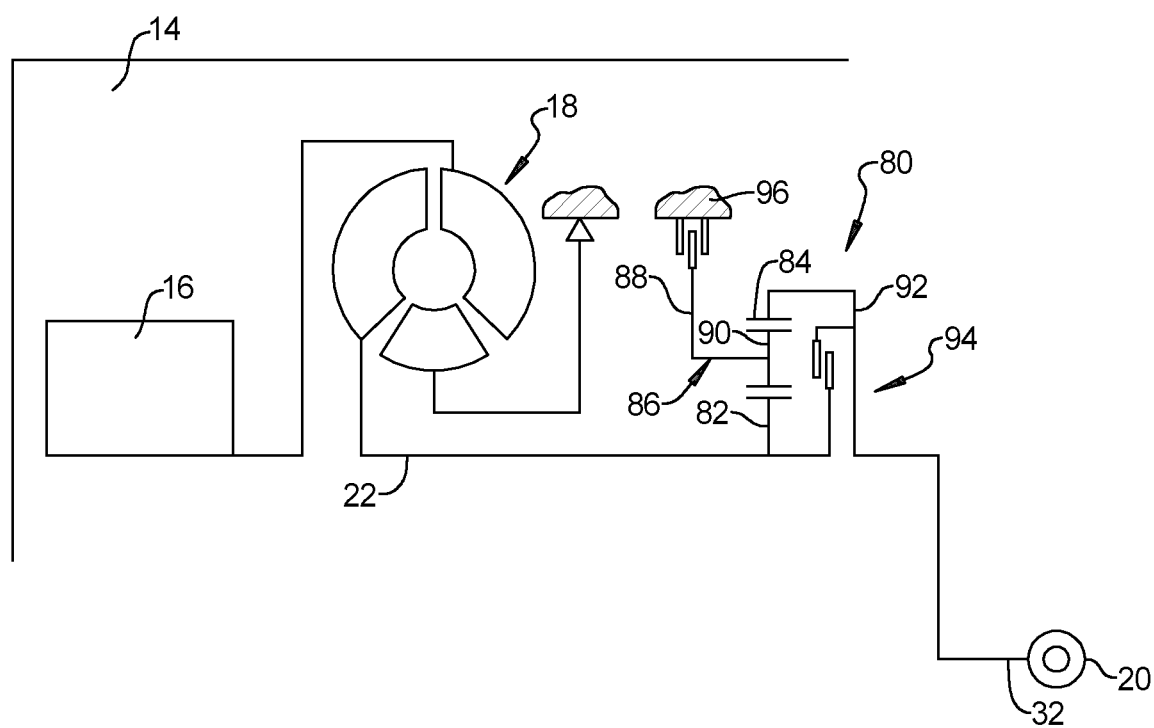
FIG. 5 is a diagram of a system similar to FIG. 1 used for a planetary gear transmission.

Referring to FIG. 5 and again to FIG. 1, the system and method of the present disclosure defines a concept that is also applicable to a step-gear such as planetary gear automatic transmissions. For example, the CVT 12 can be changed to a planetary gear transmission 80 and a shift rate of change of gears of the multiple speed planetary gear transmission 80 can be substituted for the shift rate of change of the ratios identified above for use with the CVT 12. For the planetary gear transmission 80 the above step of retrieving and applying the offset 45 may be omitted, allowing a current shift to be completed while aborting subsequent scheduled shifts, by freezing to an attained or commanded gear upon entrance into TUTD mode in lieu of to a desired gear. This allows the system and method of the present disclosure to be applied to different transmission designs.

The planetary gear transmission 80 includes a sun gear 82, a ring gear 84 and a carrier assembly 86. The carrier assembly includes a carrier spider 88 rotatably mounting a plurality of pinion gears 90. The ring gear 84 has a hub portion 92 which provides a partial housing for a clutch 94. The clutch 94, when engaged, permits the sun gear 82 to be connected with the ring gear 84. The carrier assembly 86 is operatively connected with the multiple disc fluid operated brake 96 which for example, when actuated or engaged, will hold the carrier assembly 86 stationary thereby providing a reverse ratio between the sun gear 82 and the ring gear 84. The clutch 94 and the brake 96 are fluid operated friction devices which are constructed in a well-known manner and are known to those skilled in the art of power transmissions. The clutch 94 is connected to the output shaft 32. It is noted the sun gear 82, the ring gear 84 and the carrier assembly 86 may be connected in different formats that identified above within the scope of the present disclosure.

A system and method of selecting a transmission manual mode entry gear during transient driving conditions of the present disclosure offers several advantages. These include a system and method that uses a combination of a real variator ratio, a desired variator ratio, and a rate of change of the real variator ratio to determine which ratio to freeze to upon entry.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system to select a transmission manual mode entry gear during transient driving conditions of an automobile vehicle, comprising:
   an automotive transmission;
   an engine connected to the transmission, a torque converter connected to the transmission, and a differential providing drive output;
   a controller in communication with the engine and the transmission;
   a shift device in communication with the controller providing manual selection by an operator of the automobile vehicle between a Park mode, a Reverse mode, a Neutral mode, a Drive mode and a Manual mode; and
   wherein at a time of entrance into the Manual mode a predicted gear is set to a bin center of an individual one of multiple bins adjacent to a real gear.

2. The system of claim 1, wherein the transmission defines a continuously variable transmission (CVT) having a first pulley connected to an input shaft and a second pulley rotatably driven by a belt displaceably connected to the first pulley and the second pulley.

3. The system of claim 2, further including a range of pulley ratios split into multiple bins independently defining successive segments of an overall range of ratios of the CVT.

4. The system of claim 3, wherein the predicted gear defines a predicted ratio and the real gear defines a CVT real ratio, and the predicted ratio set to the bin center of the individual one of the multiple bins adjacent to the real ratio at the time of entrance into the Manual mode includes the bin center of one bin to two bins removed from the real ratio at the time of entrance into the Manual mode.

5. The system of claim 4, further including an offset added to the CVT real ratio at the time of entrance into the Manual mode.

6. The system of claim 5, wherein the offset is based on a rate of change of the real ratio and retrieved from a memory in a calibratable lookup table.

7. The system of claim 1, wherein the transmission defines a planetary gear transmission having a sun gear, a ring gear and a carrier assembly.

8. The system of claim 7, further including a clutch and a brake which when selectively actuated provides for one of the Park mode, the Reverse mode, the Neutral mode, the Drive mode and the Manual mode, with the clutch also driving the differential.

9. The system of claim 7, wherein:
the predicted gear is set to an entrance time into the Manual mode; and
an offset is added to the real gear, the offset based on a rate of change of the real gear.

10. A method of selecting a continuously variable transmission manual mode entry ratio during transient driving conditions of an automobile vehicle, comprising:
providing a continuously variable transmission (CVT) connected to an engine;
controlling the engine and the CVT using a controller;
positioning a shift device in communication with the controller allowing selection by an operator of the automobile vehicle between a Park mode, a Reverse mode, a Neutral mode, a Drive mode and a Manual mode;
splitting a range of ratios of the CVT into multiple bins independently defining successive segments of the range of ratios; and
selecting a predicted ratio of the CVT at a time of entrance into the Manual mode at a center of one of the multiple bins adjacent to a CVT real ratio.

11. The method of claim 10, further including adding an offset to the CVT real ratio at the time of entrance into the Manual mode.

12. The method of claim 11, further including calculating the offset using a rate of change of the CVT real ratio.

13. The method of claim 12, further including retrieving the offset from a memory in a calibratable lookup table.

14. The method of claim 10, further including defining the center of one of the multiple bins close to the CVT real ratio as a bin center approximately one bin to two bins removed from the CVT real ratio at the time of entrance into the Manual mode.

15. The method of claim 10, further including connecting a first pulley to an input shaft and rotatably driving a second pulley by a belt displaceably connected to the first pulley and the second pulley.

16. The method of claim 10, further including connecting a torque converter to the CVT and providing a differential for a drive output for the automobile vehicle.

17. A method of selecting a transmission manual mode entry gear during transient driving conditions of an automobile vehicle, comprising:
shifting a PRNDL shift device to a Manual position to shift a continuously variable transmission (CVT) to a manual mode;
applying an offset to a real ratio of the CVT;
rounding the real ratio to a bin ratio center of a bin adjacent to the real ratio in a direction of a shift;
determining if a calculated entry ratio will cause the shift to pass a requested ratio;
entering the manual mode at the calculated entry ratio if the calculated entry ratio will not cause the shift to pass the requested ratio; and
entering the manual mode at a desired ratio if the calculated entry ratio will cause the shift to pass the desired ratio.

18. The method of claim 17, further including:
retrieving the offset from a lookup table saved in a memory; and
basing the offset on a rate of real ratio change.

\* \* \* \* \*